United States Patent [19]

Butenop et al.

[11] Patent Number: 4,618,108
[45] Date of Patent: Oct. 21, 1986

[54] SAFETY BELT REEL-IN MECHANISM HAVING A TENSIONING ARRANGEMENT

[75] Inventors: Klaus Butenop, Herzhorn; Doris Kröger, Elmshorn, both of Fed. Rep. of Germany

[73] Assignee: Autoflug GmbH, Rellingen, Fed. Rep. of Germany

[21] Appl. No.: 706,640

[22] Filed: Feb. 28, 1985

[30] Foreign Application Priority Data

Feb. 29, 1984 [DE] Fed. Rep. of Germany ....... 3407378

[51] Int. Cl.$^4$ ...................... B65H 75/48; B60R 22/46
[52] U.S. Cl. .................................... 242/107; 280/806
[58] Field of Search ......... 242/107, 107.4 R, 107.4 B; 280/806; 297/478, 480

[56] References Cited

U.S. PATENT DOCUMENTS

| 4,423,846 | 1/1984 | Fohl | 242/107 |
| 4,461,434 | 7/1984 | Butenop | 242/107.4 B |
| 4,508,288 | 4/1985 | Nilsson | 242/107 |

Primary Examiner—John M. Jillions
Attorney, Agent, or Firm—Becker & Becker, Inc.

[57] ABSTRACT

A safety belt reel-in mechanism having a tensioning arrangement. A piston is provided which is acted upon by pressure medium, and which is disposed at a distance relative to the belt reeling-in shaft of the belt reel-in mechanism, and can by connected with this shaft via a cable drive when the tensioning arrangement is triggered. The problem of heretofore known devices was that after the tensioning arrangement was triggered and the tensioning process was terminated, the belt reeling-in shaft was locked into position via the tensioning arrangement, and hence could no longer function as intended. To eliminate the resulting drawback that, after the tensioning arrangement is triggered, the belt reel-in mechanism no longer has a self-locking action, the present invention proposes disposing a spring-loaded locking member on the cable pulley which receives the drive cable. The locking member is adapted to engage appropriate elements on the belt reeling-in shaft to operatively connect this shaft and the cable pulley. This connection is disconnected after termination of the tensioning process.

16 Claims, 3 Drawing Figures

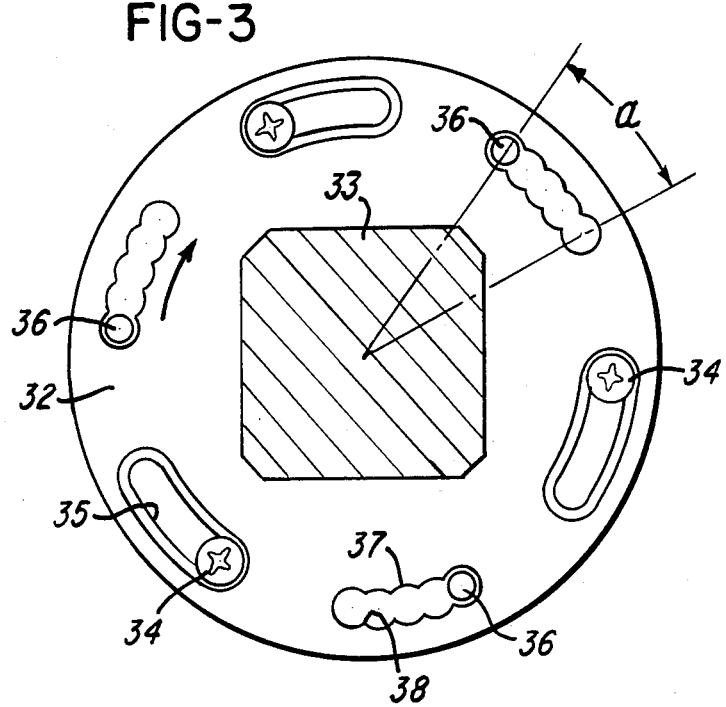

SAFETY BELT REEL-IN MECHANISM HAVING A TENSIONING ARRANGEMENT

BACKGROUND OF THE INVENTION

1. Field of the Invention

The present invention relates to a safety belt reel-in mechanism having a tensioning arrangement, comprising a piston which is acted upon by pressure medium and which is disposed at a distance relative to the belt reeling-in shaft of the belt reel-in mechanism, and which in the event of triggering can be connected via a cable drive with the belt reeling-in shaft.

2. Description of the Prior Art

A tensioning device which is to be provided on a safety belt reel-in mechanism is disclosed in German Offenlegungsschrift 30 40 667. In this arrangement, a cylinder is mounted on the housing of the belt reel-in mechanism; a piston which is operated by pressurized gas, is movably disposed in the cylinder. By means of a cable drive, the piston is drivingly connected with the reeling-in shaft of the safety belt reel-in mechanism, with the drive cable being permanently connected and, via a cable guide disposed on the piston, being guided within a sleeve placed over the belt reeling-in shaft of the reel-in mechanism. Within the sleeve, the cable is wound several times about the belt reeling-in shaft, from where it extends to a delivery spool. In this arrangement, the turns or windings of the drive cable preferably rest against the inside of the sleeve, and the drive cable should be wound two and a half times about the belt reeling-in shaft.

In the event of an accident, when the pyrotechnical charge disposed in the cylinder is ignited by a sensor associated with the vehicle, and the resulting pressurized gases act upon the piston, the latter, along with the guide roller, is forced in the direction away from the belt reel-in mechanism. As a result, the drive cable is pulled tight, and its windings are held firmly in place in the annular space about an appropriate extension of the belt reeling-in shaft, as a result of which, due to the frictional connection brought about by the wraparound angle, the shaft is turned and thus tightens the safety belt.

However, such a construction of a belt reel-in mechanism having a tensioning arrangement has the drawback that after the pyrotechnical charge is triggered, and after the resulting actuation of the cable drive, a non-releasable coupling of the tensioning arrangement and the belt reeling-in shaft is effected. The result is that after termination of the tensioning or tightening process, the belt reeling-in shaft is locked in its then achieved position and, without removing the tensioning arrangement from the shaft, which can only be effected by appropriate construction of the unit, is no longer able to function in the sense of locking in response to a sensor which is associated with the belt strand and/or the vehicle. Such a locking is described in connection with a belt reel-in mechanism which does not have a tensioning arrangement, for example in conformity with German Offenlegungsschrift 28 23 334.

This inability of the belt reeling-in shaft to function is a serious drawback, because after an unintentional triggering of the tensioning arrangement the self-locking belt reel-in mechanism can thus no longer properly perform its task of securely holding the strapped-in person in place on the seat during an accident, and of preventing forward movement of the body which would otherwise endanger the strapped-in person. If for example a car parked in a garage undergoes an automatic triggering of the tensioning arrangement, this fact cannot be readily determined. However, as soon as a person sits in the vehicle, the belt reel-in mechanism can no longer function for the aforementioned reasons, and thus endangers the safety of the person using the belt in the event of an accident.

An object of the present invention is to further improve a safety belt reel-in mechanism and tensioning arrangement of the aforementioned general type in such a way that even after triggering of the tensioning arrangement, or conclusion of the tensioning process, the belt reel-in mechanism can be reused and can be locked by means of a locking system which is responsive to movements of the belt strand and the vehicle.

BRIEF DESCRIPTION OF THE DRAWINGS

This object, and other objects and advantages of the present invention, will appear more clearly from the following specification in conjunction with the schematically illustrated drawings, in which:

FIG. 3 is a view taken along the line III—III in FIG. 1.

SUMMARY OF THE INVENTION

Figure 1:
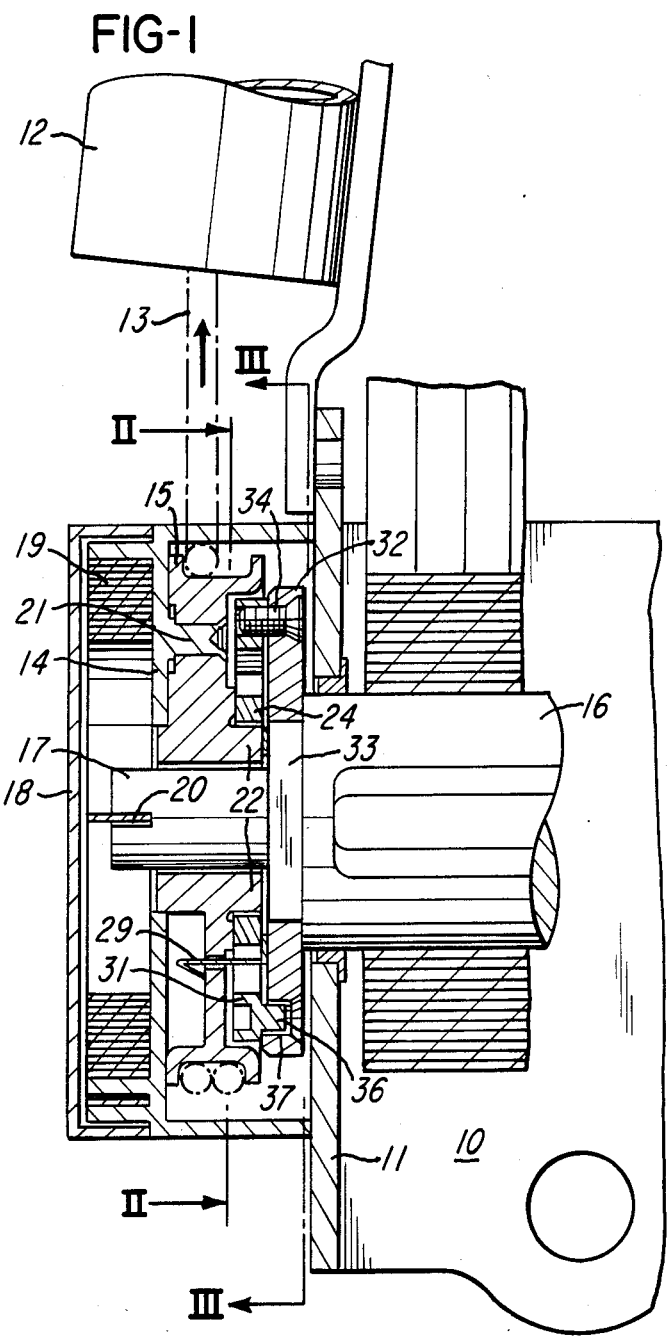
FIG. 1 is a partially sectioned front elevational view of one inventive embodiment of a safety belt reel-in mechanism having a tensioning arrangement and cable drive.
Figure 2:
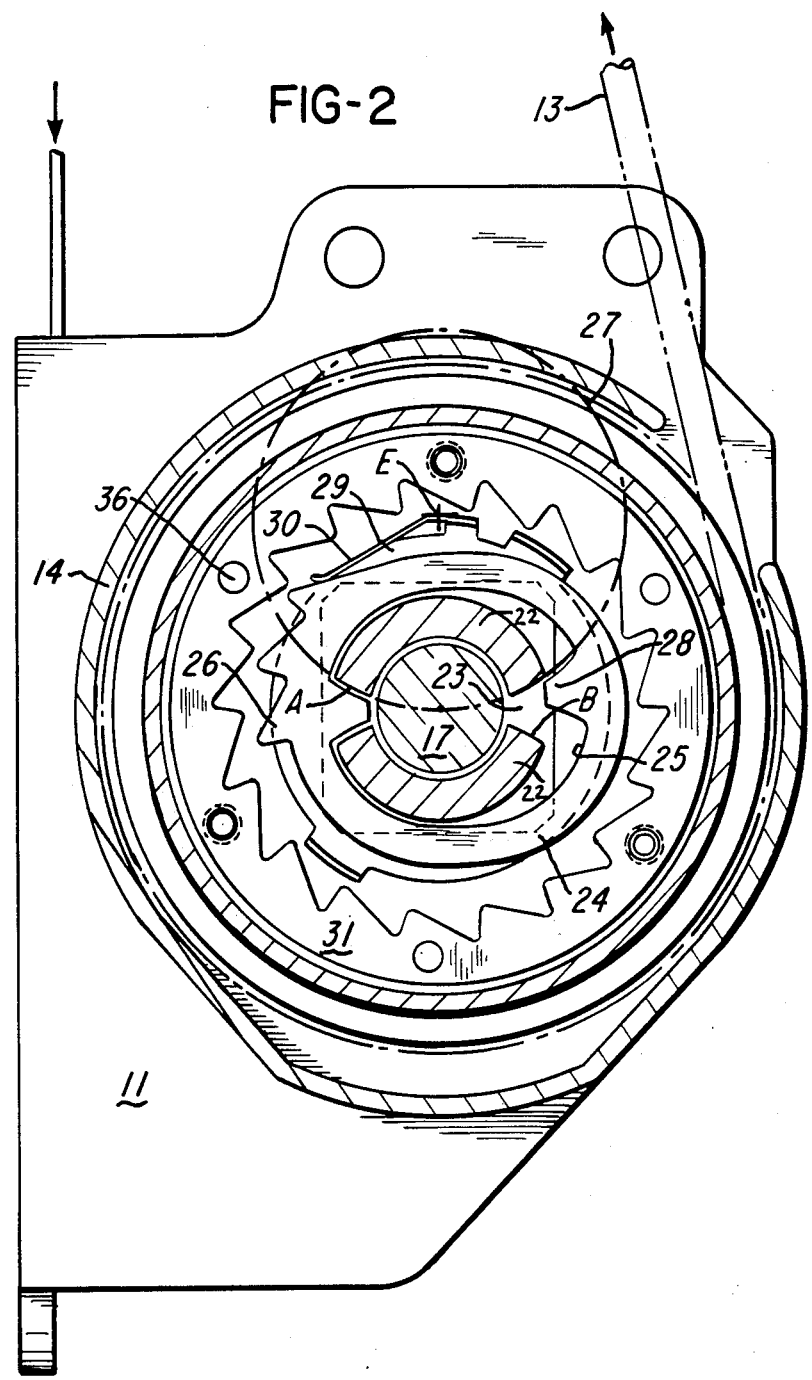
FIG. 2 is a longitudinal section taken along the line II—II in FIG. 1.

The safety belt reel-in mechanism and tensioning arrangement of the present invention is characterized primarily in that a spring-loaded locking member is disposed on the cable pulley which receives the drive cable; the locking member is adapted to engage appropriate elements on the belt reeling-in shaft to operatively connect the cable pulley and this shaft; said connection disconnects after termination of the tensioning process.

Pursuant to advantageous specific features of the present invention, the locking member may be eccentrically mounted on the cable pulley on that side thereof which faces the belt reel-in mechanism. That side of the cable pulley which faces the belt reel-in mechanism may furthermore be provided with two ring segments which project out of the plane of the cable pulley and which have spaces therebetween; an opening of the locking member may extend around the ring segments. This opening of the locking member may have a symmetrical butterfly shape, with inwardly directed bearing projections being movable in the spaces between the ring segments during a relative movement of the locking member and the cable pulley. Those surfaces of the ring segments and bearing projections which face one another may have conforming shapes.

The eccentric point for the eccentric mounting of the locking member may be disposed beyond the locking member for movement of the latter upon a circular path. The surfaces of the ring segments may be curved in conformity to the circular path.

The locking member may be held on the cable pulley in the direction of rotation thereof by means of a spring arm which engages the periphery of the locking member. The locking member may also be axially secured on the cable pulley by means of a clip. The clip and the spring arm may be made in one piece.

A coupling member may be positively mounted on the belt reeling in shaft. The positive connection between the belt reeling-in shaft and the coupling member may be effected by providing the shaft with a square section, and by providing the coupling member with a corresponding opening. The coupling member, on that side which faces the cable pulley, may support a toothed ring which extends into the plane of the locking member, and has teeth on its inner periphery. The connection between the toothed ring and the coupling member is such that it allows a relative rotation of these two parts to a certain extent. At least two screws may be provided for connecting the toothed ring and the coupling member; these screws are movable in slot-like openings in the toothed ring. The toothed ring may be provided with at least two studs or pins which engage in appropriate slot-like holes in the coupling member; these latter holes have reduced-width portions which are spaced at a distance conforming to the diameter of the pins.

A cup-shaped housing may be disposed on that side of the cable pulley which is remote from the belt reel-in mechanism. This housing surrounds the cable pulley until it comes to rest against a housing member of the belt reel-in mechanism. The housing is also designed to receive a return spring for the belt reeling-in shaft. The housing is furthermore connected to the cable pulley by means of at least two break-away pins which are formed on the housing and extend into appropriate openings in the cable pulley.

The advantage of the present invention is that a triggering of the tensioning arrangement, and the associated rigid connection of the cable drive and the belt reeling-in shaft, no longer leads to an impairment of the locking properties of the belt reel-in mechanism, since the coupling of the cable drive and the belt reeling-in shaft can again be automatically released, whereupon the belt reel-in mechanism can again function completely without the tensioning arrangement. This is further advantageous in that the vehicle, even after an accident where the tensioning arrangement is triggered, can be driven further while still providing the occupants the complete safety offered by the self-locking belt reel-in mechanism.

Pursuant to the preferred embodiment of the present invention, where a locking member which can be deflected radially is eccentrically mounted on the cable pulley in such a way that when the latter rotates during the tensioning process, the locking member lags behind this rotational movement and, due to its eccentric mounting, is deflected until its outer toothing engages a toothed ring mounted on the belt reeling-in shaft to thus convert the rotational movement of the cable pulley into a tightening or tensioning movement of the belt reeling-in shaft. Due to its spring-loaded coupling on the cable pulley, when the latter no longer moves after termination of the tensioning process, the locking member returns to its rest position and thus again frees the belt reeling-in shaft.

In addition to this connection of the belt reeling-in shaft and the cable pulley, it is also possible to damp the shock-like torsional load of the cable pulley. For this purpose, the toothed ring may be rotatable relative to the coupling member, whereby, as a consequence of suitably designed features, a partial nullification of the applied momentum can be effected by rotation of the components relative to one another. In this manner, the overall kinematics are protected from destruction or impairment by the peak forces which occur in a shock-like manner when the tensioning arrangement is triggered.

Finally, it should be noted that the present invention is not limited to tensioning arrangements having a pressure-medium drive, but can also be utilized with tensioning arrangements having other power sources, for example in the form of moved masses, pretensioned springs, and the like.

DESCRIPTION OF PREFERRED EMBODIMENTS

Referring now to the drawings in detail, the self-locking safety belt reel-in mechansim 10 has, on that side thereof opposite the so-called, non-illustrated, operational side which has the locking mechanism which is sensitive to the belt strand and the vehicle, a cylinder 12 which is mounted on the associated housing member 11, for example a B-column of the vehicle. A non-illustrated piston having a pyrotechnical propellant charge is accommodated in the cylinder 12. Attached to the piston is a drive cable 13 which is guided through a housing 14 of the safety belt reel-in mechanism 10 to a cable pulley 15, upon the periphery of which it is wound and onto which it is finally fastened.

The cable pulley 15 is mounted on an extension 17 of the belt reeling-in shaft 16, which is supported in, and passes through, the housing member 11 of the belt reel-in mechanism 10. On that side of the cable pulley 15 remote from the belt reel-in mechanism 10, the cup-shaped housing 14 is disposed on the extension 17. The housing 14 covers the cable pulley 15 to the point where the former abuts against the member 11. Furthermore, the housing 14 is provided outwardly with a peripheral ring, so that a cup-shaped configuration results which is closed-off by a housing cover 18. A return spring 19 for the belt reeling-in shaft 16 is disposed in the thus-formed cup. One end of the return spring 19 is attached to the outer periphery of the housing 14, while the other end of the return spring 19 is attached to the belt reeling-in shaft 16, which for this purpose is provided with a slot 20 at the end of the extension 17 thereof.

The housing 14 is fixed to the extension 17 of the belt reeling-in shaft 16, while the cable pulley 15 is mounted in such a way as to be rotatable relative to the housing 14, and in its rest position is connected with the housing 14 by means of three break-away pins 21. The pins 21 are defined on the housing 14 and extend into appropriate recesses in the cable pulley 15 in order to thus secure the latter axially and radially in its rest position.

Disposed on that side of the cable pulley 15 which faces the safety belt reel-in mechanism 10, and disposed concentrically to the seating of the cable pulley 15 on the shaft extension 17, are two ring segments 22 which project from the plane of the cable pulley 15, and between which are disposed the spaces 23. Eccentrically mounted on the ring segments 22 is a locking member 24 which has a central opening 25 and a partial set of peripheral teeth 26. The eccentric point E for the eccentric mounting of the locking member 24 on the ring segments 22 of the cable pulley 15 is located beyond the locking member 24, as a result of which the latter can be moved along a circular path 27 about an angle which is necessary for the pivoting movement. The central opening 25 of the locking member 24 has a butterfly-like shape, with the inwardly directed bearing projections 28, depending upon the position of the locking member 24, extending into the spaces 23 between the ring segments 22 of the cable pulley 15. The respectively contacted surfaces A, B have conforming shapes, and are provided in particular with a curvature which conforms to the radius of the circular path 27. The locking member 24 is furthermore axially retained on the cable pulley 15 by means of a clip 29, and is held in its inwardly disposed rest position by means of a spring arm 30 which engages the periphery of the locking member 24 and presses radially inwardly.

Disposed in the plane of the locking member 24 is a toothed ring 31 which surrounds the locking member and has teeth on the inside. The toothed ring 31, in turn, is mounted on a coupling member 32 which is tightly connected to the belt reeling-in shaft 16; this is accomplished in that a square opening of the coupling member 32 extends over the square end 33 on the belt reeling-in shaft 16 in that region thereof between the housing member 11 and the extension 17 of the shaft 16.

The connection of the toothed ring 31 and the coupling member 32 is such that the two parts can rotate relative to one another by an angle alpha (FIG. 3). For this purpose, the two parts are first of all interconnected by three screws 34, the heads of which rests against the coupling member 32, and the shafts of which extend into slot-like openings 35 which extend in the circumferential direction of the toothed ring 31. In addition, three studs or pins 36 are defined on the toothed ring 31. These pins 36, in turn, engage in slot-like holes 37 which are appropriately disposed in the coupling member 32. These slots 37 have reduced-width portions 38 which are spaced from one another at a distance which conforms to the diameter of the pins 36.

The inventive safety belt reel-in mechanism, which has a tensioning arrangement, operates as follows: after the propellant charge located in the cylinder 12 is activated by a sensor which is associated with the vehicle and which detects the occurrence of an accident, the resulting propellant gases drive the piston ahead of them, as a result of which a strong force soon results at the drive cable 13; by unwinding the drive cable 13 from the cable pulley 15, this force causes the cable pulley 15 to rotate. In so doing, the break-away pins 21 which axially and radially secure the cable pulley in its rest position, are sheared off, whereupon the cable pulley 15 can turn upon the shaft extension 17.

Due to its inherent mass moment of inertia, the locking member 24, which is eccentrically mounted on the cable pulley 15, lags behind the rotational movement of the cable pulley 15, and, due to its eccentric mounting, pivots outwardly about the eccentric point E against the prestress of the spring arm 30 until the peripheral toothing 26 of the locking member 24 engages with the inner teeth of the toothed ring 31.

The high torque, which occurs in a shock-like manner, is transmitted from the locking member 24 to the toothed ring 31, and is initially damped at the beginning of the tightening or tensioning movement in that the pins 36 which are defined on the toothed ring 31 are pressed by the reduced-width portions 38 into the holes 37, resulting in a corresponding strain or resilience accompanied by nullification of the peak momentum. Since at the same time the screws 34 on the coupling member 32 can also be moved by the same amount in the openings 35 in the toothed ring 31, these mounting means do not oppose the rotation of the two components namely the toothed ring 31 and the coupling member 32, relative to one another for the achievement of a momentum-nullifying resilience. In this connection, it is to be understood that a relative rotation, the extent of which is limited by the length of the openings 35 or the holes 37, only takes place to the extent that a too high initial pressure, and hence a correspondingly generated too high initial torque, must be absorbed by the damping means, so that the screws 34 and pins 36 do not necessarily in each case reach their end position in their respectively associated openings 35 or holes 37.

However, in each case the meshing of the locking member 24, which is caused to rotate by the cable pulley 15 during the tensioning process, with the toothed ring 31 also effects a rotation of the latter along with the coupling member 32, as a result of which, due to the tight mounting of the coupling member 32 on the belt reeling-in shaft 16, the rotational movement of the cable pulley 15 is finally converted into a rotational movement of the belt reeling-in shaft 16, thus tensioning the safety belt. In this connection, the torque between the locking member 24 and the cable pulley 15, which torque must be transmitted, is transmitted to the surfaces A, B of the ring segments 22 of the cable pulley 15 and of the bearing projections 28 of the locking member 24.

After termination of the tensioning process, and due to the energy utilized and the withdrawal of the drive cable 13 from the cable pulley 15, the locking member 24, when slight belt load is present, is again rolled back into its rest position by the action of the radially inwardly directed force of the spring arm 30, so that the peripheral teeth 26 of the locking member 24 are freed from the teeth of the toothed ring 31. In this manner, the force-transmitting connection between the cable pulley 15 and the belt reeling-in shaft 16 is again disconnected, so that the latter can rotate freely, and is now subjected to the action of the non-illustrated locking system, which is sensitive to the vehicle or the belt strand, during normal operation of the safety belt reel-in mechanism.

The present invention is, of course, in no way restricted to the specific disclosure of the specification and drawings, but also encompasses any modifications within the scope of the appended claims.

What we claim is:

1. A safety belt reel-in mechanism having a tensioning arrangement, including a piston which is acted upon by pressure medium and which is disposed at a distance relative to the belt reeling-in shaft of said belt reel-in mechanism; when said tensioning arrangement is triggered, said piston being connected with said belt reeling-in shaft by means of a cable drive, which includes a cable pulley for receiving a drive cable which is connected to said piston and to said cable pulley;

the improvement in combination therewith comprising: said cable pulley being mounted on an extension of said belt reeling-in shaft, a spring-loaded locking member disposed on said cable pulley; said locking member having a central opening and being held on said cable pulley, in the direction of rotation of the latter, by means of a spring arm which is mounted on said cable pulley and engages the periphery of said locking member; and, elements provided on said belt reeling-in shaft, with said locking member engaging said elements, when said tensioning arrangement is triggered, in order to operatively connect said cable pulley and said belt reeling-in shaft to effect tensioning of said safety belt; said last-mentioned connection being disconnected after termination of the tensioning arrangement-engagement so that thereafter said belt reeling-in shaft is freely rotatable relative to said cable pulley, and ring segments projecting from the plane of said cable pulley and having spaces disposed therebetween, said central opening extending around said ring segments.

2. A safety belt reel-in mechanism and tensioning arrangement in combination according to claim 1, in which said locking member is eccentrically mounted on said ring segments and cable pulley on that side thereof which faces said belt reel-in mechanism.

3. A safety belt reel-in mechanism having a tensioning arrangement, including a piston which is acted upon by pressure medium and which is disposed at a distance relative to the belt reeling-in shaft of said belt reel-in mechanism; when said tensioning arrangement is triggered, said piston being connected with said belt reeling-in shaft by means of a cable drive, which includes a cable pulley for receiving a drive cable which is connected to said piston and to said cable pulley;

the improvement therewith comprising: said cable pulley being mounted on an extension of said belt reeling-in shaft, a spring-loaded locking member including a spring arm mounted on said cable pulley and engageable with said locking member; and elements provided on said belt reeling-in shaft, with said locking member engaging said elements, when said tensioning arrangement is triggered, in order to operatively connect said cable pulley and said belt reeling-in shaft to effect tensioning of said safety belt; said last-mentioned connection being disconnected after termination of the tensioning arrangement engagement so that thereafter said belt reeling-in shaft is freely rotatable relative to said cable pulley; said locking member being eccentrically mounted on said cable pulley on that side thereof which faces said belt reel-in mechanism; said cable pulley, on that side thereof which faces said belt reel-in mechanism, being provided with two ring segments, which project from the plane of said cable pulley, and between which are disposed respective spaces; and in which said locking member is provided with a central opening which extends around said ring segments.

4. A safety belt reel-in mechanism and tensioning arrangement according to claim 3, in which said central opening of said locking member has a symmetrical butterfly shape, with said locking member having two inwardly directed bearing projections which are movable into and out of said spaces between said ring segments when said locking member and said cable pulley move relative to one another.

5. A safety belt reel-in mechanism and tensioning arrangement according to claim 4, in which said ring segments and said bearing projections have surfaces which face one another, with said surfaces having shapes which conform to one another.

6. A safety belt reel-in mechanism and tensioning arrangement according to claim 3, in which the eccentric point for said eccentric mounting of said locking member is disposed externally of the latter so that said locking member can move along a circular path.

7. A safety belt reel-in mechanism and tensioning arrangement according to claim 6, in which the surfaces of said ring segments are curved in conformity to said circular path.

8. A safety belt reel-in mechanism and tensioning arrangement according to claim 3, in which said locking member is held on said cable pulley, in the direction of rotation of the latter, by means of a spring arm which is mounted on said cable pulley and engages the periphery of said locking member.

9. A safety belt reel-in mechanism and tensioning arrangement according to claim 8, which includes a clip for axially securing said locking member on said cable pulley.

10. A safety belt reel-in mechanism and tensioning arrangement according to claim 9, in which said clip and said spring arm are in one piece.

11. A safety belt reel-in mechanism and tensioning arrangement according to claim 3, which includes a coupling member rotatable for momentum-nullifying resilience, which is positively mounted on said belt reeling-in shaft.

12. A safety belt reel-in mechanism and tensioning arrangement according to claim 11, in which, in order to effect said positive mounting of said coupling member on said belt reeling-in shaft, that portion of said shaft adjacent to said extension thereof has a square shape, and said coupling member has a corresponding opening.

13. A safety belt reel-in mechanism and tensioning arrangement according to claim 11, in which said coupling member, on that side thereof which faces said cable pulley, supports a toothed ring which extends in the plane of said locking member and has teeth on its inner periphery.

14. A safety belt reel-in mechanism and tensioning arrangement according to claim 13, in which said toothed ring and said coupling member are connected to one another in such a way that they can rotate a certain amount relative to one another.

15. A safety belt reel-in mechanism and tensioning arrangement according to claim 14, in which said connection of said toothed ring to said coupling member is effected by at least two screws, which are mounted in said coupling member and are movable in slot-like openings of said toothed ring.

16. A safety belt reel-in mechanism and tensioning arrangement according to claim 15, in which said toothed ring is provided with at least two pins, which are movable in slot-like holes of said coupling member; said last-mentioned holes have reduced-width portions which are spaced at a distance conforming to the diameter of said pins.

* * * * *